Figure 1:
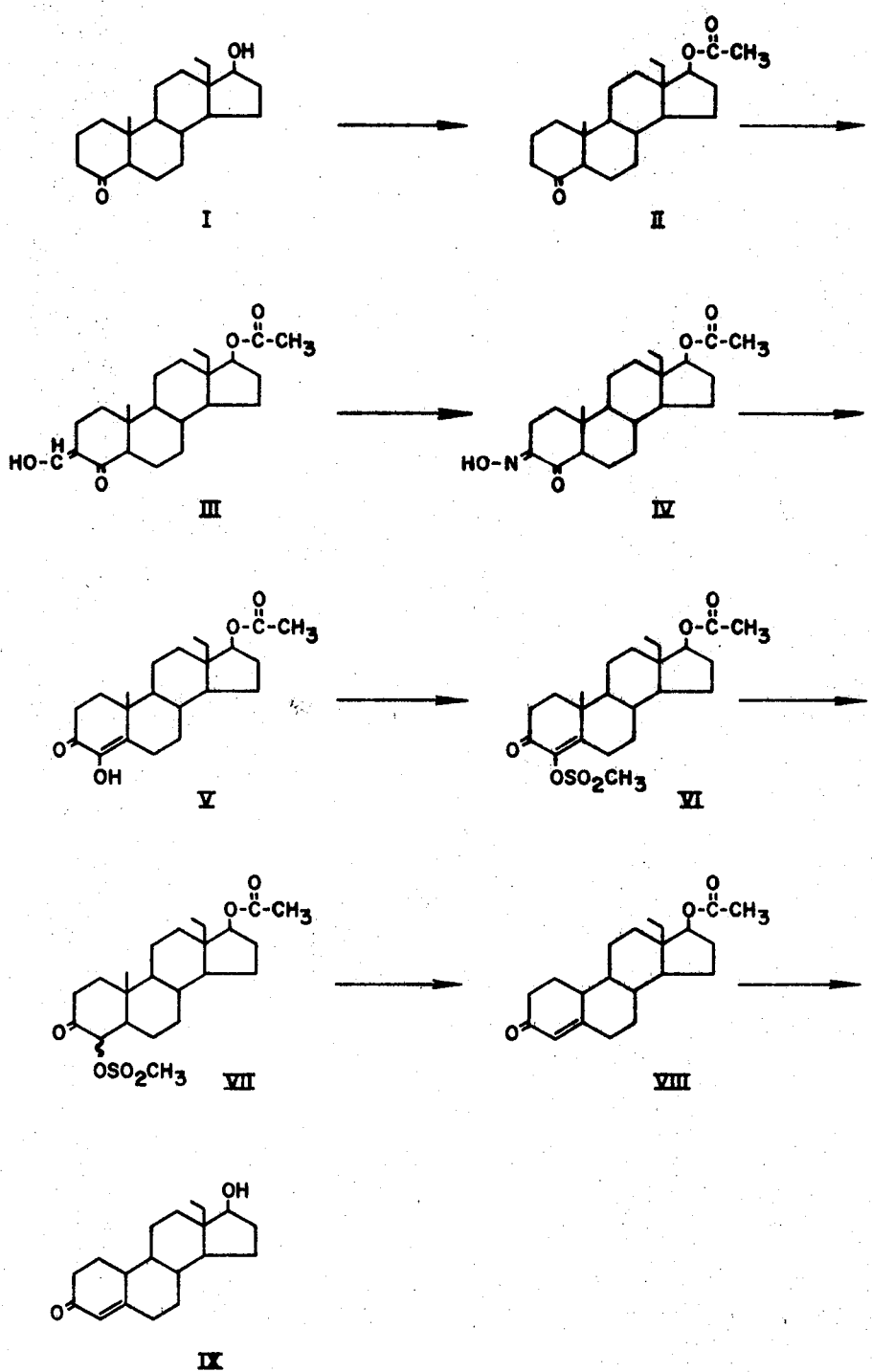

United States Patent

[11] 3,607,889

| [72] | Inventors | Donald P. Strike<br>Philadelphia;<br>David R. Herbst, King of Prussia; Herchel Smith, Wayne, all of Pa. |
|---|---|---|
| [21] | Appl. No. | 551,317 |
| [22] | Filed | May 19, 1966 |
| [45] | Patented | Sept. 21, 1971 |
| [73] | Assignee | American Home Products Corporation<br>New York, N.Y. |

[54] 10β-METHYL-13β-POLYCARBONALKYLGON-4-EN-3-ONES
9 Claims, 2 Drawing Figs.

[52] U.S. Cl. .................................................. 260/397.4,
260/239.55, 260/239.57, 260/397.3, 260/397.5,
260/999

[51] Int. Cl. ...................................................... C07c 169/20
[50] Field of Search .......................................... Machine
Searched Steroids

*Primary Examiner*—Henry A. French
*Attorneys*—John J. Hagen and Vito Victor Bellino ABSTRACT: 13-Aklyl-10-methylgon-4-en-3-ones possessing androgenic, anabolic, progestational activity are prepared from the correspondingly substituted 13-alkyl-10-methylgonan-4-ones wherein groups labile to mesylation are protected to permit selective mesylation of subsequently formed 4-hydroxy group, by converting the 4-one to its 3-hydroxymethylene derivative, hydrolyzing the oximino group, mesylating the 4-hydroxy group, catalytically hydrogenating the unsaturation at the 4-position, and eliminating the 4-mexyloxy group to form the 4-en-3-one conjugated system.

10β-METHYL-13β-POLYCARBONALKYLGON-4-EN-3-ONES

This invention relates to compositions of matter classified in the art of chemistry as substituted gon-4-en-3-ones.

The invention sought to be patented in a principal composition aspect is described as residing in the concept of a gon-4-en-3-one having attached thereto a methyl group at the 10-position and a polycarbonalkyl group at the 13-position.

The tangible embodiments of the principal compositions of the invention possess the inherent general physical properties of being white crystalline solids, are substantially insoluble in water, are generally soluble in polar solvents such as dimethylacetamide. Examination of the compounds produced according to the hereinafter described process reveals, upon infrared, ultraviolet, and nuclear magnetic resonance spectrographic analysis, spectral data supporting the molecular structure hereinbefore set forth. For example, the 10-methyl and the 13-polycarbonalkyl groups are evident in the nuclear magnetic resonance spectrum and the 4-en-3-one conjugated system is evident in the ultraviolet and infrared spectra. The aforementioned physical characteristics, taken together with the elemental analysis, the nature of the starting materials, and the mode of synthesis, further confirm the molecular structure hereinbefore set forth for the compositions sought to be patented.

The tangible embodiments of the principal compositions of the invention possess the inherent applied use characteristics of exerting qualitatively varying hormonal effects in animals as evidenced by pharmacological evaluation according to standard test procedures. Such tangible embodiments possess androgenic, anabolic, progestational, and antiandrogenic activity. In addition to their inherent applied use characteristic, the compositions of the invention possess the further applied use characteristic of being intermediates for making compositions which possess applied use characteristics of exerting qualitatively varying hormonal effects in animals as evidenced by pharmacological evaluation according to standard test procedures and which are within the generic scope of the invention.

The invention sought to be patented in a principal process of making the compositions aspect, is described as residing in the concept of a sequence of reactions, including: converting a 17-hydroxy-10-methyl-13-alkylgonan-4-one whose 17-hydroxy group is protected to permit selective mesylation of the hereinafter formed 4-hydroxy group to the 3-hydroxymethylene derivative, converting the so-obtained 3-hydroxymethylene derivative to the corresponding 3-oximino derivative, hydrolyzing the 3-oximino derivative to obtain the corresponding 4-hydroxy-4-en-3-one; mesylating the 4-hydroxy group, catalytically hydrogenating the unsaturation at the 4-position and eliminating methane sulfonic acid to obtain a 13-alkyl-10-methylgon-4-en-3-one.

The invention sought to be patented in a first subgeneric aspect is a 4-hydroxy-10-methyl-13-polycarbonalkylgon-4-en-3-one.

The tangible embodiments of the primary first subgeneric aspect of the invention possess the inherent general physical properties of being white crystalline solids, are substantially insoluble in water and are generally soluble in polar solvents such as dimethylacetamide. Examination of compounds produced according to the hereinafter-described process reveals, upon ultraviolet, infrared, and nuclear magnetic resonance spectrographic analysis, spectral data confirming the molecular structure hereinbefore set forth. For example, the 4-hydroxy-4-en-3-one structure is assigned rather than the theoretical alternative 3-hydroxy-2-en-4-one, from its proton nuclear magnetic resonance spectrum which shows no signal for a vinyl proton. The aforementioned physical characteristics taken together with the elemental analysis, the nature of the starting materials, and the mode of synthesis, further confirm the structure of the compositions sought to be patented.

The tangible embodiments of said first subgeneric composition aspect possess the applied use characteristic of being intermediates for the preparation of compositions exerting hormonal effects as evidenced by standard test procedures.

The invention sought to be patented in a second subgeneric composition aspect is described as residing in the concept of a 4-methylsulfonyloxy-10-methyl-13-polycarbonalkylgon-4-en-3one.

The tangible embodiments of the second subgeneric composition aspect of the invention possess the inherent general physical properties of being white crystalline solids, are substantially insoluble in water, are generally soluble in polar solvents, such as dimethylacetamide. Examination of the compounds produced according to the hereinafter described process reveals, upon infrared, ultraviolet, and nuclear magnetic resonance spectrographic analysis, spectral data confirming the molecular structure hereinbefore set forth. For example, the 4-en-3-one conjugated system is evident in the ultraviolet. The aforementioned physical characteristics, taken together with the elemental analysis, the nature of the starting materials, and the mode of synthesis further confirm the structure of the compositions sought to be patented.

The manner of making and using the invention will now be generally described so as to enable a person skilled in the art of chemistry to make and use the same as follows: In describing the invention, reference will be made to the annexed drawings, wherein:

FIG. 1 illustrates schematically the reaction sequence for preparing a gon-4-en-3-one having attached thereto a methyl group at the 10-position and an alkyl group at the 13-position from the corresponding gonan-4-one, specifically 13-ethyl-17-hydroxy-10-methlgon-4-en-3-one from 13-ethyl-17-hydroxy-10-methlgonan-4-one.

Figure 2:
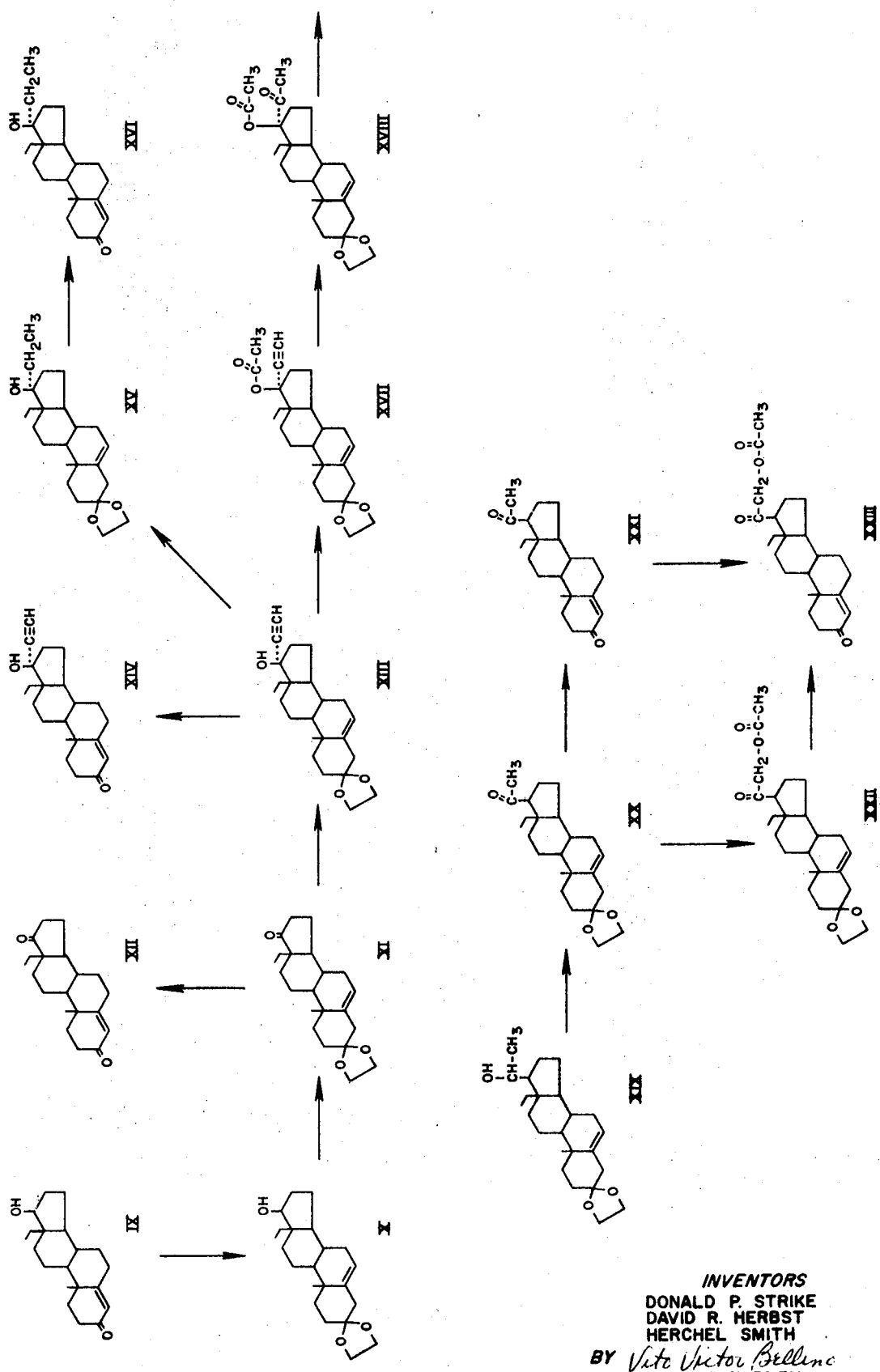

FIG. 2 illustrates schematically the reaction sequence for using a gon-4-en-3-one having attached thereto a methyl group at the 10-position and a 13-polycarbonalkyl group, specifically 13-ethyl-17-hydroxy-10-methylgon-4-en-3-one, as intermediates for making other compositions possessing the applied use characteristic of exerting qualitatively varying hormonal effects in animals.

Referring now to FIG. 1 wherein the compounds are assigned Roman numerals sequentially for identification, the starting materials for the process of the invention i.e. the 13-alkyl-17-hydroxy-10-methylgonan-4-one (I) are prepared as described in U.S. Pat. Application, Ser. No. 551,391 filed even day herewith now U.S. Pat. No. 3,452,004 and in the Preparations appended hereto. The 17-hydroxy group of said starting compound is esterified preferably with acetic anhydride in the presence of pyridine to protect the labile 17-hydroxy group so as to permit selective mesylation of the later-formed 4-hydroxy group in the hereinafter-described reactions. The 17-hydroxy group can also be protected by forming other alkanoyl or aroyl esters or by other methods known to those skilled in the art of chemistry. The so-formed ester (II) is treated with ethyl formate and an alkali metal alcoholate such as sodium methoxide to prepare the corresponding 3-hydroxymethylene derivative (III). Reaction with an alkali metal nitrite such as sodium nitrite in acetic acid-methylene dichloride converts the 3-hydroxymethylene derivative to the corresponding 3-oximino derivative (IV). Hydrolysis of the said oxime produces the corresponding 4-hydroxy-4-en-3-one (V). Mesylation of the 4-hydroxy group with methane sulfonyl chloride in pyridine (VI), followed by hydrogenation of the 4-unsaturation in the presence of 10 percent palladized charcoal (VII), and dehydromesylation by treatment with lithium chloride-lithium carbonate at 140°in dimethylformamide yields the corresponding 13-alkyl-17-hydroxy-10-methylgon-4-en-3-one ester (VIII). On hydrolysis of the protecting 17-ester, there is obtained 13-alkyl-17-hydroxy-10-methylgon-4-en-3-one.

Referring now to FIG. 2, wherein the compounds are also assigned Roman numerals sequentially for identification, there is schematically illustrated methods of using compounds of the invention by converting them to other compounds within the generic scope of the invention, which possess the applied use characteristics of exerting qualitatively varying hormonal characteristics in animals as evidenced by pharmacological evaluation according to standard test procedures. By reference to FIG. 2 and the appended examples, or to the chemical literature, the procedure for converting the 17-hydroxy group of the compound produced by the process of the invention in FIG. 1 (IX) or its esters (VIII), by methods known in the art, to 17-carbonyl (XI) (XII), and converting said carbonyl to alkylhydroxymethylene (XV) (XVI), for example the 17α-methyl-17β-hydroxy or 17β-ethyl-17α-hydroxy derivative by addition of the appropriate organometallic compound, or to alkynylhydroxymethylene (XIII) (XIV) for example the 17α-ethynyl-17β-hydroxy, or 17α-chloroethynyl-17β-hydroxy derivative by addition of the appropriate alkali metal acetylide, to alkenylhydroxymethylene, for example the 17α-alkenyl-17β-hydroxy derivative by reduction of the alkynylhydroxymethylene, or to progesterone (XIII→XXI) and desoxycorticosterone acetate (→XXIII) homologs, is evident. The 17-carbonyl group may also be ketalized or thioketalized by treating with the appropriate alcohol or glycol, in a suitable solvent under acidic conditions, as in the presence of an acid such as sulfuric acid, p-toluenesulfonic acid, or boron trifluoride etherate, with heating where necessary according to known procedures. Similarly the 17-hydroxy can be converted to carboxylic acid esters other than the acetate, including esters of aliphatic and aromatic acids, or it can be etherified to form 17-ethers by procedures known in the art.

The hereinbefore described processes of making and using offer a novel, unique, and feasible wholly synthetic route to the corresponding natural steroids if the 13-alkyl group in the starting compound is methyl, for example testosterone, progesterone and the corticoids. Moreover as indicated above they offer a novel, unique, and feasible totally synthetic route to compounds unobtainable from natural steroids, when the 13-alkyl group is polycarbonalkyl. The 13-polycarbonalkyl group can be of varying chain length, such as, for example, ethyl, propyl, isopropyl, butyl, isobutyl, pentyl, etc., even cetyl, and for the processes of the invention when such groups are present in the starting material, they will correspondingly be present in the intermediates and the final product, and are full equivalents in the process as particularly described and claimed.

It will be apparent to those skilled in the art that the starting compounds can bear groups which are unaffected by the process reactions such as, for example, but not limited thereto, 6- or 7-methyl, or the starting compound can bear other labile groups which can be protected to allow selective reaction, such as, for example, but not limited thereto, the 11-hydroxy or the 16-hydroxy group which can be protected by esterification in analogous fashion to the manner in which the 17-hydroxy group is protected in the description hereinabove, and these variations for the process of the invention, except for the limitations expressed above, are full equivalents of the process, as particularly described.

It will also be apparent to one skilled in the art of chemistry that if the 17-position of the starting material is substituted only with hydrogen, or with a group inert to the subsequent process reactions, that protection of the 17-position to permit selective reaction is not required, and that when a starting material thus substituted is employed in the process of the invention, this variation is the full equivalent of the process as particularly described and claimed.

While the tetracyclic compounds in the specification and the appended examples are named either without regard to configuration or to describe the configuration corresponding to that of the natural steroid, it is to be understood, the product of the given manipulative procedures is a racemic mixture which contains the compound corresponding to the natural steroid and its enantiomorph if the starting compound was a racemic mixture. However, if the starting compound is a particular enantiomorph the final product also has the same enantiomorphic configuration.

When employed in the applied use characteristic of exerting qualitatively varying hormonal effects, the products of the invention are administered in pharmaceutical forms known to those skilled in the art of pharmacy. Solid form preparations include powders, tablets, dispersible granules, capsules, cachets, and suppositories. A solid carrier can be one or more substances which may also act as diluents, flavoring agents, solubilizers, lubricants, suspending agents, binders, or tablet disintegrating agents; it can also be an encapsulating material. In powders the carrier is a finely divided solid which is in admixture with the finely divided active compound. In the tablets the compound is mixed with a carrier having the necessary binding properties in suitable proportions and compacted in the shape and size desired. The powders and tablets preferably contain from 5 to 10 to 99 percent of the active ingredient. Suitable solid carriers are magnesium carbonate, magnesium stearate, talc, sugar, lactose, pectin, dextrin, starch, gelatin, tracanth, methyl cellulose, sodium carboxymethylcellulose, low-melting wax, and cocoa butter. Tablets, powders, cachets, and capsules can be used for oral administration, and can be incorporated into formulations to obtain delayed or sustained release effects.

Liquid form preparations include solutions, suspensions, and emulsions. The compounds are insoluble in water, but can be dissolved in aqueous-organic solvent mixtures that are non-toxic in the amounts used. As an example may be mentioned water-propylene glycol solutions for parenteral injection. Liquid preparations can also be formulated in solution, in aqueous polyethyleneglycol. Aqueous suspensions suitable for oral use can be made by dispersing the finely divided compound in water with viscous material, such as natural or synthetic gums, resins, etc., for example, gum arabic, ion-exchange resins, methylcellulose, sodium carboxymethylcellulose, and other known suspending agents.

The quality of compound in a unit dosage form may be adjusted from less than 1 mg. to 100 mg. (generally within the range of 2.5 to 25 mg. and the effective dosage depends upon the severity of the condition being treated, the stage, the individual case, and the compound, and will be determined by an attending physician. Generally, a dosage range of from 0.25 to about 15 mg. per kg. of body weight per day constitutes the overall range.

The following examples illustrate the best mode contemplated by the inventors of carrying out the process of the invention and the manner of making and using as intermediates the compositions of the invention. PREPARATION 1 di-13-Ethylogon-4-en-17β-ol, acetate

Keep a solution of 13.5 g. of dl-13β-ethylgon-4-en-17β- ol in 150 ml. of pyridine and 30 ml. of acetic anhydride at room temperature for 16 hours, Evaporate the solvents and crystallize the resulting solid residue from hexane to obtain 11.6 g. of crude product. Recrystallize twice from hexane to obtain the title product, m.p. 93—94°, $\lambda_{max.}^{KBr.}$ 5.75 (s) (ester carbonyl), 8.03 (s) (ester C-O) μ.

$C_{21}H_{32}O_2$ analysis:
Calculated    C, 79.70; H, 10.19%.
Found         C, 79.69; H, 10.31%.

Prepare in an analogous manner, the 13-methyl compound d-estr-4-en-17β-ol, acetate, m.p. 81—82°, $\lambda_{max.}^{KBr.}$ 5.80, 8.00 μ from d-estr-4-en-17β-ol.

PREPARATION 2 dl-5ξ-bromo-13β-ethyl-17β-hydroxygonan-4-one, acetate

Treat a solution of 4.7 g. of dl-13 β-ethylgon-4-en-17β-ol, acetate in 100 ml. of dioxane and 25 ml. of water with 3.4 g. of N-bromosuccinimide and a solution of 1.0 ml. of 70 percent perchloric acid in 5 ml. of water. Keep the mixture at room temperature for 1.25 hours, decolorize the orange solution with potassium bicarbonate dilute with 200 ml. of water and extract four times with ether. Wash the ether extract with water, dry over sodium sulfate and evaporate to obtain 6.56 g. of crude bromohydrin, an oily solid.

Treat a stirred, cooled solution of the above bromohydrin (6.56 g.) in 100 ml. of acetone with Jones reagent (8N chromium trioxide in aqueous sulfuric acid) until an orange color persists. Remove the cold water bath and stir the solution for 20 minutes. Destroy the excess Jones reagent with isopropyl alcohol, neutralize the solution with potassium bicarbonate, evaporate to a slurry, dilute with water and extract four times with ether. Wash the ether extract with water, dry over sodium sulfate and evaporate to yield 5.54 g. of a yellow, oily solid. Crystallize from acetone-hexane to obtain the title product, m.p. 137–138°, $\lambda_{max.}^{KBr.}$ 5.77, 5.84, 8.01 $\mu$, $\lambda_{max.}^{95\%}$ EtOH 310 ($\xi$100) mu.

Analysis for $C_{21}H_{31}BrO_3$:
Calculated   C, 61.31; H, 7.60; Br, 19.42%.
Found        C, 61.45; H, 7.37; Br, 19.0%.

Prepare in an analogous manner, the 13Methyl compound, d-5$\xi$-bromo-17$\beta$-hydroxyestran-4-one, acetate, m.p. 151–153° $\lambda_{max.}^{KBr.}$ 5.75, 5.87, 8.00 $\mu$ from d-estr-4-en-17$\beta$-ol, acetate.

PREPARATION 3 dl-13$\beta$-ethyl-17$\beta$-hydroxygon-5(10)-en-4one, acetate

Reflux a solution of 27.0 g. of dl-5$\xi$-bromo13$\beta$-ethyl-17$\beta$-hydroxygonan-4-one, acetate in 150 ml. of pyridine for one hour, dilute with water and extract with ether. After washing with 2N hydrochloric acid, dry the extract and evaporate to yield a yellow solid. Dissolve the solid in benzene and rapidly chromatograph on a short neutral alumina (activity 3) column giving 20.2 g. of crude product. Recrystallize from acetone-hexane to obtain the title product, m.p. 143–144°, $\lambda_{max.}^{KBr.}$ 5.75, 6.00, 8.05$\mu$ $\lambda_{max.}^{95\%}$EtOH 251 ($\xi$13,600) m$\mu$ NMR: 2.07, 4.84 p.p.m.

Analysis for $C_{21}H_{30}O_3$:
Calculated   C, 76.32; H, 9.15%.
Found        C, 76.08; H, 9.01%.

Prepare in an analogous manner, the 13-methyl compound, d-17$\beta$-hydroxyestr-5(10)-en-4-one, acetate, m.p. 140.5–142°, $\lambda_{max}^{KBr}$ 5.75, 6.05, 6.17, 8.05 $\mu$, $\lambda_{max}^{95\%\ EtOH}$ 251 m$\mu$ ($\xi$ 13,000), from d-5$\xi$-bromo-17$\beta$-hydroxyestran-4-one, acetate.

PREPARATION 4 dl-10$\beta$Cyano-13$\beta$-ethyl-17$\beta$-hydroxy-5$\alpha$-gonan-4-one, acetate Add a solution of 2.7 ml. of hydrocyanic acid in 50 ml. of cooled tetrahydrofuran slowly to a stirring ice cold mixture of 82.0 ml. of 25% diethyl aluminum bromide in heptane and 80 ml. of tetrahydrofuran under nitrogen. Add a solution of 7.9 g. of dl-13$\beta$-ethyl-17$\beta$-hydroxygon-5(10)-en-4-one, acetate in 75 ml. of tetrahydrofuran to the above mixture, remove the ice bath, discontinue the nitrogen and stopper the flask lightly. Keep the mixture at room temperature for 5 hours, and then add slowly to 1 liter of stirring ice cold 5% sodium hydroxide and extract with chloroform. Wash the extract with water, dry over sodium sulfate and evaporate to obtain 8.82 g. of pale yellow solid. Run a benzene solution of the crude product through a short neutral alumina (activity 3) column and crystallize the resulting solid from hexane-acetone to obtain the title product, m.p. 183–185°, $\lambda_{max.}^{KBr.}$ 4.50, 5.80, 8.00 $\mu$.

Analysis for $C_{22}H_{8}NO_3$:
Calculated   C, 73.91; H, 8.74; N, 3.92%.
Found        C, 74.08; H, 8.43; N, 3.88%.

Prepare in an 22manner, the 13methyl compound, d-10$\beta$-cyano-17$\beta$-hydroxy-5$\alpha$-estran-4-one, acetate, m.p. 201–203°, $\lambda_{max.}^{KBr.}$ 4.50, 5.80, 8.01 $\mu$, from d-17$\beta$-hydroxyestr-5(10)-en-4-one, acetate.

PREPARATION 5 dl-13$\beta$-Ethyl-17$\beta$-hydroxy-10$\beta$-methyl-5$\beta$-gonan-4-one

Reflux a solution of 5.0 g. of dl-10$\beta$-cyano-13$\beta$-ethyl-17$\beta$-hydroxy-5$\alpha$-gonan-4-one, acetate, 200 mg. of p-toluenesulfonic acid and 25 ml. of ethylene glycol in 250 ml. of benzene for 16 hours with a Dean-Stark water separator. Evaporate the benzene, dilute the residue with water and extract with chloroform. Wash the extract with water, dry and evaporate to obtain 6.0 g. of white, solid ketal.

Add a solution of the above 6.0 g. of ketal in 200 ml. of tetrahydrofuran dropwise, over 15 minutes, to a stirring ice cold mixture of 6.0 g. of lithium aluminum hydride in 400 ml. of tetrahydrofuran under nitrogen. Reflux the mixture for 18 hours, cool in ice and decompose cautiously by adding a mixture of 100 ml. of 0.86 M potassium sodium tartrate and 25 ml. of 0.5 M tartaric acid. Dilute the mixture with water and extract with chloroform. Wash the extract with water, dry and evaporate to obtain 6.0 g. of white imine.

Stir and heat a solution of the above 6.0 g. of imine, 30 g. of potassium hydroxide and 30 ml. of hydrazine hydrate in 420 ml. of diethyleneglycol at a reaction temperature of 140—150° for 2 hours. Remove the condenser, heat the reaction until the temperature attains 210°, replace the condenser and reflux the mixture for 6 hours. Dilute the cooled solution with water, extract with chloroform and wash the extract with water, dry and evaporate to obtain 4.3 g. of solid methyl-ketal.

Reflux a solution of the above 4.3 g. of methyl-ketal in 200 ml. of acetone and 10 ml. of concentrated hydrochloric acid for 15 minutes, evaporate and dilute with water. Extract the mixture with chloroform and wash with water, dry, evaporate and chromatograph on neutral alumina (Act. 3). Elute with benzene and recrystallize from acetone-hexane to obtain the title product, m.p. 182–184°, $\lambda_{max.}^{KBr.}$ 2.90, 5.92 $\mu$. NMR: 0.75, 1.88, 3.74 (triplet) p.p.m.

Analysis for $C_{20}H_{32}O_2$:
Calculated   C, 78.89; H, 10.59%.
Found        C, 78.75; H, 10.47%.

Prepare in an analogous manner, the 13-methyl compound d-17$\beta$-hydroxy-5$\alpha$-androstan-4-one (reported in Helv. Chim. Acta 46, 352-64 (1963) and CA 58, 14051g.) from d-10$\beta$-cyano-17$\beta$-hydroxy-5$\alpha$-estran-4-one, acetate.

EXAMPLE 1 d-17$\beta$-Acetoxy-5$\alpha$-androstan-4-one

Heat d-17$\beta$-hydroxy-5$\alpha$-androstan-4-one (0.97 g.) on a steam bath for one hour in acetic anhydride (5 ml.)-pyridine (15 ml.) to obtain the title product as a yellow solid.

EXAMPLE 2 dl-17$\beta$-Acetoxy-13$\beta$-ethyl-b 10$\beta$methylgonan-4-one

Treat dl-13$\beta$-ethyl-17$\beta$-hydroxy-10$\beta$-methylgonan-4-one by the method of example 1 to obtain the title product m.p. 174–176° $\lambda_{max.}^{KBr.}$ 5.74, 5.84, 8.10 $\mu$.

EXAMPLE 3 d-17β-Acetoxy-3-hydroxymethylene-5α-androstan-4-one

Keep the product of example 1 (1.1 g.) for 2 days in ether (50 ml.)-ethyl formate (10 ml.) containing sodium methoxide (2 g.). Add water, separate the aqueous layer and wash it with ether, acidify with hydrochloric acid, and extract with chloroform. Wash the chloroform solution with water, dry and evaporate to obtain the title product (0.96 g.), $\lambda_{max}$ 279 mμ.

EXAMPLE 4 dl-17β-Acetoxy-13β-ethyl-3-hydroxymethylene-10β-methylgonan-4-one

Treat the product of example 2 by the method of example 3 to obtain the title product, $\lambda_{max}$ 281 mμ.

EXAMPLE 5 d-17β-Acetyoxy-3-oximino-5α-androstan-4-one

Add sodium nitrite (0.36 g.) in water (5 ml.) with stirring to the product of example 3 (0.96 g.) in acetic acid (60 ml.)-methylene dichloride (12 ml.)-water (3 ml.) at 0°. Stir for 45 minutes, dilute the mixture with methylene dichloride, wash with water until neutral, dry and evaporate to give the title product (0.90 g.), $\lambda_{max}$ 240 mμ.

EXAMPLE 6 dl-17β-Acetoxy-13β-ethyl-10β-methyl-3!-oximinogonan-4-one

Treat the product of example 4 by the method of example 5 to obtain the title product, $\lambda_{max.}^{EtOH}$ 235 mμ.

EXAMPLE 7 d-4-Hydroxytestosterone-17-acetate

Reflux the product of example 5 (0.9 g.) for 10 hours in acetic acid (35 ml.)-water (15 ml.)-pyruvic acid (5 ml.). Concentrate the reaction mixture, dilute with chloroform, wash successively with 5% aqueous potassium bicarbonate and water, dry and evaporate. Chromatograph the residue on silica gel and crystallize from acetone-hexane to obtain the title product, m.p. 187–189°, undepressed by an authentic sample; m.p. 188–190°, prepared by the method of B. Camerino, et al., [J. Am. Chem. Soc., 78, 3540 (1956)], $(\alpha)_D$ +82.4° (chloroform), $\lambda_{max.}^{EtOH}$ 281 mμ ($\xi$12,000); $\lambda_{max.}^{KBr}$ 3.0, 5.75, 6.0, 6.1, and 8.05 μ. NMR: 0.83, 1.17, 2.04, 4.64 (triplet) 2.84 p.p.m.

Analysis for $C_{21}H_{30}O_4$:
  Calculated  C, 72.80; H, 8.73%.
  Found  C, 73.28; H, 8.37%.

EXAMPLE 8 dl-13β-Ethyl-4,17β-dihydroxy-10β-methylgon-4-en3-one, 17-acetate

Treat the product of example 6 by the method of example 7 to obtain the title product, m.p. 184–186°, $\lambda_{max.}^{KBr}$ 2.95, 5.75, 6.0, 6.10, 8.05 μ, $\lambda_{max.}^{EtOH}$ 275 mμ ($\xi$12,600). NMR: 1.17, 2.03, 3.87 (triplet), 6.18 p.p.m.

Analysis for $C_{22}H_{32}O_4$:
  Calculated  C, 73.30; H, 8.95%.
  Found  C, 73.22; H, 8.89%.

EXAMPLE 9 d-4,17β-Dihydroxyandrost-4-en-3-one, 17-acetate, 4-methanesulfonate

Keep d-4,17β-dihydroxyandrost-4-en-3-one, 17-acetate (5 g.) at 0° with methanesulfonyl chloride (5 ml.) in pyridine (100 ml.) for 16 hours. Add the mixture to ice water (1 l.) and filter the precipitate. Treat the precipitate with Norit in acetone and recrystallize from acetone-hexane to obtain the title product (4.2 g.), m.p. 185–187°, $\lambda_{max.}^{EtOH}$ 248 mμ ($\xi$14,900; $\lambda_{max.}^{KBr}$ 5.78, 5.93, 6.20, 7.40, 8.03, and 8.59 μ; NMR: 0.83, 1.26, 2.03, 3.37, 4.65 (triplet) p.p.m.

Analysis for $C_{22}H_{32}O_6S$:
  Calculated  C, 62.24; H, 7.60; S, 7.6%.
  Found  C, 62.53; H, 7.47; S, 7.7%. acetone-hexane, treat with Norit in acetone and recrystallize from acetone-hexane

EXAMPLE 10 dl-13β-ethyl-4,17β-dihydroxy-10β-methylgon-4-en-3-one, 17-acetate, 4-methanesulfonate Treat dl-13β-ethyl-4,17β-dihydroxy-10β-methylgon-4-en-3-one, 17-acetate, by the manipulative procedure of example 9 to obtain the title product, m.p. 211–213°, $\lambda_{max.}^{KBr}$ 5.75, 5.95, 6.18, 7.40, 8.05, 8.50 μ, $\lambda_{max.}^{EtOH}$ 243 mμ ($\xi$14,400), NMR: 1.26, 2.04, 3.37, 4.67 (triplet) p.p.m.

Analysis for $C_{23}H_{34}O_6S$:
  Calculated  C, 62.98, H, 7.81; S, 7.31%.
  Found  C, 63.01; H, 7.88; S, 7.2%.

EXAMPLE 11 d-4ξ-17β-dihydroxy-5ξ-androstan-3-one, 17-acetate, 4-methanesulfonate

Shake the product of example 9 (1.0 g.) at atmospheric pressure under hydrogen in ethyl acetate (40 ml.)-sulfuric acid (1 ml.) containing 10% palladized charcoal (0.2 g.). After 1.4 moles of gas have been absorbed (35 min.), filter the mixture and wash the filtrate successively with 5% aqueous KHCO₃ and water, dry and evaporate. Dissolve the residual solid in acetone (60 ml.) and add 8 N chromic acid in aqueous sulfuric acid (A. Bowers, T. G. Halsall, E. R. H. Jones, and A. J. Lemin, J. Chem. Soc. 1953, 2555) dropwise with stirring until a red color persists. Stir for a further 30 min., discharge the red color with isopropyl alcohol, concentrate the mixture to 15 ml., dilute with water, and extract with chloroform. Evaporate the washed and dried extracts and crystallize the residue from acetone-n-hexane to obtain the title product (0.55 g.). The analytical sample has m.p. 174–175° (decomposition), $\lambda_{max.}^{KBr}$ 5.74, 7.40, 8.05 and 8.53 μ.

Analysis for $C_{22}H_{34}O_6S$:
  Calculated  C, 61.9; H, 8.0; S, 7.5%.
  Found  C, 62.0; H, 8.0; S, 7.8%.

EXAMPLE 12 dl-13β-ethyl-4ξ, 17β-dihydroxy-10β-methyl-5ξ-gonan-3-one, 17-acetate-4-methanesulfonate Treat the product of Example 10 by the manipulative procedure of example 11 to obtain the title product, m.p. 187–188°(Dec.); $\lambda_{max.}^{KBr.}$ 5.80, 8.0, 8.50 μ.

Analysis for $C_{23}H_8O_6S$:
Calculated   C, 62.70; H, 8.24; S, 7.28%.
Found        C, 62.82; H, 8.27; S, 7.3%.

EXAMPLE 13 d-Testosterone acetate

Stir and heat the product of example 11 (0.54 g.) under nitrogen for 4 hours with lithium chloride (2 g.) and lithium carbonate (1.2 g.) in dimethylformamide (75 ml.) at 140°. Evaporate the solvent and percolate the residue in benzene through a short column of a alumina (activity 3). Crystallize the product from acetone-hexane, treat with Norit in acetone and recrystallize from acetone-hexane to give the title product; m.p. 137–139°, undepressed on admixture with authentic testosterone acetate and having an identical NMR spectrum, $\lambda_{max.}^{EtOH}$ 241 mμ (ξ16,000), $\lambda_{max.}^{KBr.}$ 5.75, Calculated, 6.20 and 8.0 μ.

Analysis for $C_{21}H_{30}O_3$:
Calculated   C, 76.3; H, 9.15%.
Found        C, 76.2; H, 9.2%.

EXAMPLE 14 dl-13β-Ethyl-17β-hydroxy-10β-methygon-4-en-3-one, 17-acetate

Treat the product of example 12 by the manipulative procedure of example 13 to obtain the title product, m.p. 159–160° $\lambda_{max.}^{KBr.}$ 5.75, 5.98, 6.20, 8.10μ, $\lambda_{max.}^{EtOH}$ 238 mμ(ξ 15,700), NMR: 1.18, 2.02, 4.67 (triplet), 5.72 p.p.m.

Analysis for $C_{22}H_8O_3$:
Calculated   C, 76.70; H, 9.36%.
Found        C, 76.75; H, 9.08%.

EXAMPLE 15 dl-13β-Ethyl-17β-hydroxy-10β-methylgon-4-en3-one

Reflux a mixture of 2.1 g. of dl-13β-ethyl-17β-hydroxy-10β-methylgon-4-en-3-one, acetate, 2.0 g. of potassium hydroxide, 10 ml. of water and 100 ml. of methanol under nitrogen for 1 hour. Concentrate the mixture to a slurry, dilute with chloroform, wash with water and dry over sodium sulfate. Evaporate the chloroform solution and crystallize the residue from acetone to obtain 1.0 g. of the title product, m.p. 198–200° $\lambda_{max.}^{KBr.}$ 3.0, 6.00, 6.20 μ, $\lambda_{max.}^{EtOH}$ 240 mμ (ξ15,600), NMR: 1.03 (triplet), 1.20, 1.90, 3.75 (triplet), 5.74 p.p.m.

Analysis for $C_{20}H_{30}O_2$:
Calculated   C, 79.42; H, 10.00%.
Found        C, 79.23; H, 9.93%.

EXAMPLE 16 dl-13β-Ethyl-3,3-ethylenedioxy-10β-methylgon-5-en-17-one

Reflux a mixture of 0.35 g. of dl-13β-ethyl-17β-hydroxy-10β-methylgon-4-en3-one, 20 mg. of p-toluenesulfonic acid, 4 ml. of ethylene glycol and 40 ml. of benzene with a Dean-Stark water separator for 18 hours. Dilute the mixture with ether, wash with water, dry and evaporate to obtain 0.50 g. of dl-13β-ethyl-3,3-ethylenedioxy-10β-methylgon-5-en-17β-ol.

Reflux the above 0.50 g. of 3-ketal in 85 ml. of benzene and 25 ml. of methyl ethyl ketone under nitrogen for one-half hour with a Dean-Stark water separator after removing the first 20 ml. of benzene distillate. Add a solution of 0.5 g. of aluminum isopropoxide in 15 ml. of benzene and reflux the mixture under nitrogen for 4 hours. Dilute the mixture with ether, wash with water, dry and evaporate. Chromatograph the resulting residue on neutral alumina (Act. 3) and elute with benzene to obtain 0.26 g. of the title product, m.p. 162–166°, $\lambda_{max.}^{KBr.}$ 5.75 μ.

EXAMPLE 17 dl-13β-Ethyl-3,3-ethylenedioxy-17α-ethynyl-17β-hydroxy-10β-methylgon-5-ene

Bubble acetylene through a stirred solution of 1.0 g. of dl-13β-ethyl-3,3-ethylenedioxy-10βmethylgon-5-en-17-one in 35 ml. of dimethyl acetamide at room temperature for three-quarters hour. Add 0.7 g. of lithium acetylide-ethylenediamine complex and stir at room temperature for 2½ hours. Add the solution slowly to ice water mixture and extract with ether. Wash the ether extract with water, dry and evaporate to obtain 1.0 g. of the title product, a solid whose infrared spectrum is devoid of ketone absorption.

EXAMPLE 18 dl-13β-Ethyl-17α-ethynyl-17β-hydroxy-10β-methylgon-4-en-3-one

Keep a solution of 1.0 g. of dl-13β-ethyl-3,3-ethylene-dioxy-17α-ethynyl-17β-hydroxyl-10β-methylgon-5-ene in 30 ml. of tetrahydrofuran and 6 ml. of 3M perchloric acid at room temperature for 2 hours. Basify the solution with 5% potassium bicarbonate concentrate under vacuum and add water. Extract the mixture with chloroform, wash the extract with water, dry and evaporate. Chromatograph the residue on neutral alumina (Act. 3), elute with 1:19 ether-benzene and crystallize from acetone-hexane to obtain 0.31 g. of the title product, m.p. 205–207°, $\lambda_{max.}^{KBr.}$ 3.03, 3.08, 6.05, 6.22 μ, $\lambda_{max.}^{EtOH}$ 240 mμ (ξ16,000), NMR: 1.02 (triplet), 1.18, 2.27, 2.58, 5.57 p.p.m.

Analysis for $C_{22}H_8O_2$:
Calculated   C, 80.93; H, 9.26%.
Found        C, 80.94; H, 9.11%.

EXAMPLE 19 dl-13β, 17β-Diethyl-17β-hydroxy-10β-methylgon-4-en-3-one

Add a solution of 1.2 g. of dl-13β-ethyl-3,3-ethylene-dioxy-17α-ethynyl-17β-hydroxy-10β-methylgon-5-ene in 50 ml. of ethyl acetate and 25 ml. of benzene to 0.6 g. of 2% palladium oxide-strontium carbonate catalyst prehydrogenated in 20 ml. of ethyl acetate and 20 ml. of benzene and hydrogenate at room temperature and atmospheric pressure. After 2½ hours and an uptake of 2.2 moles of hydrogen, filter the mixture and evaporate the filtrate to obtain 1.0 g. of oily dl-13β, 17α-diethyl-3,3-ethylenedioxy-17β-hydroxy-10β-methylgon-5-ene.

Keep a solution of the above 1.0 g. of 17α-ethyl-3-ketal compound in 40 ml. of tetrahydrofuran and 9 ml. of 3M perchloric acid at room temperature for 2 hours. Basify the solution with 5% potassium bicarbonate, concentrate under vacuum and add water. Extract the mixture with chloroform, wash the extract with water, dry and evaporate. Chromatograph the residue on neutral alumina (Act. 3), elute with benzene and crystallize from acetone-hexane to obtain the title product (0.47 g.), m.p. 132–133°, $\lambda_{max.}^{KBr.}$ 2.95, 6.03, 6.18 μ, $\lambda_{max.}^{EtOH}$ 241 mμ ($\varepsilon$16,000). NMR: 1.20, 5.74 p.p.m.

Analysis for $C_{22}H_{34}O_2$:
Calculated   C, 79.95; H, 10.37%.
Found        C, 79.67; H, 10.14%.

EXAMPLE 20

17β-Acetoxy-13β-ethyl-3,3-ethylenedioxy-17α-ethynyl-

10β-methylgon-5-ene

Reflux 13β-ethyl-3,3-ethylenedioxy-17α-ethynyl-17β-hydroxy-10β-methylgon-5-ene (3 g.) with acetic anhydride (48 ml.)-acetyl chloride (24 ml.)-pyridine (2.4 ml.) for 2 hours. Evaporate the mixture to dryness under reduced pressure and partition the residue between benzene-ether and water. Wash, dry and evaporate the organic layer to obtain the title product.

EXAMPLE 21

17α-Acetyl-17β-acetoxy-13β-ethyl-3,3-ethylendioxy-

10β-methylgon-5-ene

Stir Dowex 50 ion exchange resin (400 ml.; acid form) for 30 minutes with water (1.6 l.)-concentrated sulfuric acid (43 ml.). Decant off the liquid, wash the resin with water until free of sulfate ion, then add it to mercuric acetate (5 g.) in water (1.66 l.). Stir the mixture for 10 minutes, pour off the liquid and wash the residue with water until free of mercuric ion. Reflux an aliquot of this resin (200 ml.) with 17β-acetoxy-13 β-ethyl-3,3-ethylenedioxy-17α-ethynyl-10β-methylgon-5ene (10 g.) in ethanol (300 ml.) for 6 hours. Filter the cooled mixture, dilute the filtrate with methylene dichloride (2.5 l.) and wash the resulting solution with water and evaporate it under reduced pressure. If the residue shows appreciable infrared absorption in the 6.0 μ region, reflux it for 5 hours in benzene (500 ml.)-ethylene glycol (50 ml.) containing toluene p-sulfonic acid (1 g.) using a Dean-Stark reflux head for continual removal of water. Wash the cooled mixture with water, dry, and evaporate to dryness under reduced pressure. Chromatograph this product or that obtained directly from the initial hydration reaction on deactivate alumina eluting with benzene and mixtures of benzene and ether to obtain the title product.

EXAMPLE 22

13β-Ethyl-3,3-ethylenedioxy-17β-1'-hydroxyethyl-

10β-methylgon-5-ene

Add 17α-acetyl-17β-acetoxy-13β-ethyl-3,3-ethylenedioxy-10β-methylgon-5-ene (2.4 g.) in tetrahydrofuran (100 ml.) to a stirred solution of lithium (1 g.) in liquid ammonia (100 ml.). After 30 minutes add methanol (80 ml.) followed by lithium (0.5 g.) in small pieces with further stirring. After a further 10 minutes add water, and extract the mixture with ether. Evaporate the washed and dried ethereal solution to obtain the title product.

EXAMPLE 23

17β-Acetyl-13β-ethyl-3,3-ethylenedioxy-10β-methylgon-5-ene

To pyridine (85 ml.) at 10–15° add chromium trioxide (8.82 g.) over 10 minutes with stirring and after a further 15 minutes add 13β-ethyl-3,3-ethylenedioxy-17β-1'-hydroxyethyl-10β-methylgon-5-ene (9.7 g.) in pyridine (100 ml.) with stirring. Allow the reaction mixture to warm to 25° and after stirring for a further 3 hours pour into ice water (1 l. and extract with ether. Evaporate the washed and dried extracts removing the last traces of pyridine with azeotropic distillation with toluene to obtain the title product.

EXAMPLE 24

17β-Acetyle-13 β-ethyl-10β-methylgon-4-en-3-one.

Keep 17β-acetyle-13β-ethyl-3,3-ethylenedioxy-10β-methylgon-5-ene (1 g.) for 1½ hours at 25° in acetone (100 ml.) containing p-toluenesulfonic acid monohydrate (150 mg.). Add aqueous sodium bicarbonate solution, extract the product with ether and purify it by chromatography on deactivated alumina. Elute with mixtures of hexane-benzene, pure benzene, and mixtures of benzene-ether to obtain the title product.

EXAMPLE 25

17β-2'-Acetoxyacetal-13β-ethyl-10β-methylgon-4-en-3-one

Stir 17β-acetyl-13β-ethyl-10β-methylgon-4-en-3-one (3.91 g.) for 4 hours at room temperature with lead tetra-acetate (6.52 g.) in benzene (190 ml.)-methanol (10 ml.) containing boron trifluoride-ether complex (25 ml.). Isolate the product with chloroform and purify by chromatography on deactivated alumina. Elute with mixtures of pentane-benzene and pure benzene to obtain the title product.

EXAMPLE 26

17β-2'-Acetoxyacetyl-13β-ethyl-3,3-ethylenedioxy-

10β-methylgon-5-ene

Stir 17β-acetyl-13β-ethyl-3,3-ethylenedioxy-10β-methylgon-5-ene (3.53 g.) for 4 hours at room temperature with lead tetra-acetate (6.52 g.) in benzene (190 ml.)-methanol (10 ml.) containing boron trifluoride-ether complex (25 ml.). Isolate the product with chloroform and purify by chromatography on alumina. Elute with mixtures of pentane-benzene and pure benzene to obtain the title product.

EXAMPLE 27

17β2'-Acetoxyacetyl-13β-ethyl-10β-methylgon-4-en-3-one

Keep 17β-2'-acetoxyacetyl-13β-ethyl-3,3-ethylenedioxy-10β-methylgon-5-ene (2 g.) for 2 hours at room temperature in acetone (100 ml.) containing p-toluenesulfonic acid monohydrate (150 mg.). Add sodium bicarbonate solution, extract the product with ether and chromatograph it on deactivated alumina. Elute with mixtures of hexane-benzene and pure benzene to obtain the title product.

EXAMPLE 28

13β, 17-Diethyl-3,3-ethylenedioxy-10β-methylgon-5,17(20)-diene

Add 20 mls. of phosphorous oxychloride dropwise over 2 hours to a stirring solution of 10 g. of 13β,17α-diethyl-3,3-ethylenedioxy-17β-hydroxy-10β-methylgon-5-ene in 50 ml. of pyridine and reflux the mixture for 2 hours. Pour the cooled reaction mixture into ice water, extract with ether, wash the extract with water, dry and evaporate. Chromatograph the residue on deactivated alumina and elute with hexane-benzene mixtures to obtain the title product.

EXAMPLE 29

13β-17--Diethyl-10β-methylgon-4,17(20)-dien-3-one

Keep a solution of 2.0 g. of 13β,17-diethyl-3,3-ethylenedioxy-10β-methylgon-5,17(20)-diene and 0.3 g. of p-toluenesulfonic acid in 200 ml. of acetone for 2 hours at 25°. Add aqueous sodium bicarbonate solution, extract the product with ether and purify it by chromatography on deactivated alumina. Elute with mixtures of hexane-benzene, pure benzene and mixtures of benzene-ether to obtain the title product.

EXAMPLE 30

17β-Acetyl-13β-ethyl-17α-hydroxy-10β-methylgon-4-en-3-one

Treat an ice-cold solution of 3.8 g. of 13β, 17-diethyl-10β-methylgon-4,17(20)-dien-3-one in 200 ml. of t-butyl alcohol containing 9.3 ml. of pyridine and and 1.9 ml. of water with 3.8 g. of N-methylmorpholine oxide, 8.0 g. of phenyl iodosoacetate and 40 mg. of osmium tetroxide. Stir the slurry at 0° for 2 days, add a solution of 1.5 g. of sodium sulfite in 100 ml. of water and stir the mixture for 15 minutes. Filter, concentrate the filtrate, dilute with water and extract with chloroform. Wash the extract with water, dry, and evaporate. Chromatograph the residue on deactivated alumina and elute with benzene-ether mixtures to obtain the title product.

EXAMPLE 31

17α-Acetoxy, 17β-acetyl -13β-ethyl-10β-methylgon-4-en-3-one

Keep a solution of 1.0 g. of 17β-acetyl-13β-ethyl-17α-hydroxy-10β-methylgon-4-en-3-one and 1.0 g. of p-toluenesulfonic acid in 50 ml. of acetic acid and 10 ml. of acetic anhydride for 16 hours at 25°. Dilute the mixture with ether, wash with water, dry and evaporate. Chromatograph the residue on deactivated alumina and elute with hexane-benzene, benzene, and benzene-ether mixtures to obtain the title product.

EXAMPLE 32

13β-Ethyl-17β-hydroxy-10β-methylgon-4-en-3-on-17α-ylpropynoic acid

Add methylmagnesium bromide in tetrahydrofuran (6 ml. of 3M) with stirring to a refluxing solution of 13β-ethyl-3,3-ethylenedoxy-17α-ethynyl-10β-methyl-17β-hydroxygon-5-ene (0.8 g.) in tetrahydrofuran (5 ml., previously distilled from methylmagnesium bromide). Reflux with stirring for 24 hr. under carbon dioxide maintained at a pressure slightly greater than atmospheric. Add the cooled mixture to an excess of ice cold 0.4 N sulfuric acid and remove most of the solvents under reduced pressure. Extract the residue with either and evaporate the washed and dried extracts. Chromatograph the residue on silica gel elute with benzene, benzene-ethyl acetate mixtures, and pure ethyl acetate to obtain the title product.

EXAMPLE 33

3(13β-Ethyl-17β-hydroxy-10β-methylgon-4-en-3-on-17α-yl)

propionic acid lactone

Shake a solution of 13β-ethyl-17β-hydroxy-10β-methylgon-4-en-3-on-α-yl acid (0.37 g.) in methanol (60 ml.) containing 2% palladised strontium carbonate (0.1 g.; prehydrogenated *in situ*) until 2 milliequivalents of hydrogen (ca. 45 ml.) are taken up. Add celite, filter the suspension and evaporate the filtrate to obtain the title product.

EXAMPLE 34

3(13β-Ethyl-17β-hydroxy-10β-methylgona-4,6-dien-3-on-17αyl)

propionic acid lactone

Reflux 3-(13β-ethyl-17β-hydroxy-10β-methylgon-4-en-3-on-17αyl) propionic acid lactone (0.5 g.) for 2 hr. in acetic anhydride (9 ml.)-acetyl chloride (3.5 ml.)-pyridine (0.35 ml.). Evaporate the solution under reduced pressure to obtain the crude 3- (3-acetoxy-13β-ethyl-17β-hydroxy-10β-methylgona-3,5-dien-17α-yl) propionic acid lactone. Add N-bromosuccinimide (0.275 g.) portionwise with stirring to the foregoing acetoxylactone (0.55 g.) in acetone (47.3 ml.)-water (15 ml.) at 0° containing pyridine (0.32 ml.), acetic acid (1.5 ml.) and sodium acetate (1.5 g.). Stir the mixture for 2 hr., add it to brine and extract with ether. Evaporate most of the ether at 15° under reduced pressure, then add calcium carbonate (1.65 g.) and dimethylformamide (38.5 ml.). Evaporate the remaining ether and reflux the mixture for a further 2 hr. Filter the cooled mixture, wash the filtered solids with ether, combine the filtrate and washings and evaporate the washed and dried organic solution. Chromatograph the residue on acid-washed alumina, eluting with benzene and benzene ether mixtures to obtain the title product.

EXAMPLE 35

3(7α-Acetylthio-13β-ethyl-17β-hydroxy-10β-methylgon-4-en-3 on-17αon-17α-yl)propionic acid lactone

Reflux 3-(13β-ethyl-17β-hydroxy-10β-methylgona-4,6-dien-17α-yl) propionic acid lactone (0.225 g.) in thioacetic acid (1 ml.) for 2 hr. Remove the excess acid under reduced pressure and chromatograph the residue on silica gel, eluting with benzene and benzene-ether mixtures to obtain the title product.

EXAMPLE 36 dl-13β-Ethyl-10β-methylgon-4-en-3,17-dione

Keep a solution of 1.0 g. of dl-13β-ethyl-3,3-ethylenedioxy-10β-methylgon-5-en-17-one in 30 ml. of tetrahydrofuran and 6 ml. of 3M perchloric acid at room temperature for 2 hours. Basify the solution with 5% potassium bicarbonate, concentrate under vacuum and add water. Extract with chloroform wash with water, dry and evaporate. Chromatograph the residue on deactivated alumina and elute with benzene-ether mixtures to obtain the title product.

The subject matter which the applicants regard as their invention is particularly pointed out and distinctly claimed as follows:

1. A process for preparing a 13-alkyl-10-methylgon-4-en-3-one comprising:
   a. converting a 10-methyl-13-alkylgonan-4-one to its 3-hydroxymethylene derivative by reacting said gonan-4-one with an alkyl formate in the presence of an alkali metal alcoholate,
   b. converting the 3-hydroxymethylene derivative to the 3-oximino derivative by reaction with an alkali metal nitrite,
   c. hydrolyzing the oximino group in the presence of an acid to obtain the 4-hydroxy-4-en-3-one derivative,
   d. mesylating the 4-hydroxy group in the presence of an organic base,
   e. catalytically hydrogenating the unsaturation at the 4-position with hydrogen in the presence of a catalyst,
   f. eliminating the 4-mesyloxy group in the presence of an alkali metal salt to form the 4-en-3-one conjugated system.

2. The process of claim 1, wherein the 13-alkyl group is methyl.

3. The process of claim 2, wherein the 13-alkyl group is ethyl.

4. A compound having the structure

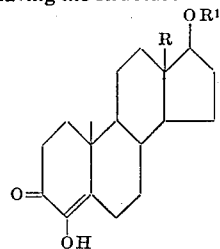

wherein R is a polycarbonalkyl group containing from 2 to about
 16 carbon atoms, and
 R¹ is hydrogen or lower carboxylic acid acyl.

5. A compound of claim 4 wherein R is ethyl.

6. 13β-Ethyl-4,17β-dihydroxy-10β-methylgon-4-en-3-one, 17-acetate.

7. A compound having the structure

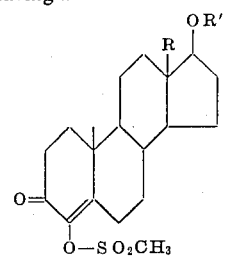

wherein R is a polycarbonalkyl group containing from 2 to about
 16 carbon atoms,
 R' is hydrogen or lower carboxylic acid acyl.

8. A compound of claim 7 wherein R is ethyl.

9. 13β-Ethyl-4,17β-dihydroxy-10β-methyl-4-en-3-one, 17-acetate, 4-methanesulfonate.